United States Patent [19]
Morasca et al.

[11] Patent Number: 5,850,492
[45] Date of Patent: Dec. 15, 1998

[54] ACOUSTO-OPTICAL WAVEGUIDE DEVICE WITH COMPENSATION OF POLARIZATION MODE DISPERSION

[75] Inventors: Salvatore Morasca, Como; Steffen Schmid, Monza, both of Italy

[73] Assignee: Pirelli Cavi S.p.A., Italy

[21] Appl. No.: 744,792

[22] Filed: Nov. 6, 1996

[30] Foreign Application Priority Data

May 3, 1996 [IT] Italy ................................. MI96A0865

[51] Int. Cl.⁶ ....................................................... G02B 6/00
[52] U.S. Cl. ................................................................ 385/11
[58] Field of Search ................................... 385/11, 15, 16, 385/484, 485, 487, 495, 499; 359/249, 498, 499; 372/30, 29

[56] References Cited

FOREIGN PATENT DOCUMENTS

0533398A1  9/1992  European Pat. Off. .......... G02F 1/09
0566800A1  11/1992  European Pat. Off. .......... G02F 1/09

OTHER PUBLICATIONS

IEEE Photonics Technology Letters, Nov. 1994, USA vol. 6, No. 11, pp. 1335–1337.

*Primary Examiner*—Akm E. Ullah
*Attorney, Agent, or Firm*—Brooks Haidt Haffner & Delahunty

[57] ABSTRACT

An acousto-optical waveguide device with compensation of polarization mode dispersion (PMD) comprises at least one first and one second optical path in optical waveguide and at least one compensation optical path connected to the first and second optical path. The compensation optical path has a prefixed PMD such that the passage time of a first polarization component of an optical signal in the first optical path and in the compensation optical path is substantially equal to the passage time of a second polarization component in the second optical path and in the compensation optical path.

17 Claims, 6 Drawing Sheets

ACOUSTO-OPTICAL WAVEGUIDE DEVICE WITH COMPENSATION OF POLARIZATION MODE DISPERSION

The present invention relates to an acousto-optical waveguide device with compensation of polarization mode dispersion.

In optical telecommunications networks for transmission of optical signals devices are used both in integrated optics, such as optical switches, optical filters and such like, and in discrete optics, built of birefringent materials, such as for example lithium niobate ($LiNbO_3$). Such materials exhibit two indices of refraction of different value, an ordinary one $n_o$ and an extraordinary one $n_e$. Thus, the optical signals that pass through these devices are subjected to a split into two orthogonal polarization components, that propagate one with the ordinary index of refraction $n_o$ and the other with the extraordinary index of refraction $n_e$.

Thus, generally, the two polarization components have passage times of different values. The difference between the passage times of the two polarization components causes a phase displacement of the signal depending on the polarization denominated "polarization mode dispersion" (PMD).

In particular, the passage time t necessary to cover an optical path with length L in a material having an index of refraction n is given by the following expression:

$$t = nL/c,$$

where $c = 3 \cdot 10_8$ m/sec is the speed of light in vacuum.

The difference in the passage times or the differential delay $\Delta t$ of the two orthogonal polarization components having indices of refraction $n_o$ and $n_e$ in the optical path with length L is given by the following expression:

$$\Delta t = (n_o - n_e) \cdot L/c = \Delta n \cdot L/c$$

where $\Delta n$ is the difference between the ordinary and the extraordinary indices of refraction or birefringence.

It follows that there is a phase displacement between the two polarization components that can cause a decay of the optical signal, with high penalties in terms of the error rate (Bit Error Rate, BER) in the case of a high value of the product $\Delta n \cdot L$.

For example, in a planar acousto-optical device made in an x-cut crystal of lithium niobate, having propagation along the y-axis (y-propagation) and thus with optical axis z in the plane of propagation, the polarization component TM (transversal magnetic), perpendicular to the plane of propagation, has the ordinary index of refraction and the polarization component TE (transversal electrical), parallel to the plane of propagation, has an extraordinary index of refraction. At wavelengths around 1550 nm, the ordinary index of refraction of $LiNbO_3$ is equal to about 2.226 while the extraordinary index of refraction is equal to about 2.154. Similar differences of the index of refraction between the TE and the TM components are observed in waveguides made, for example, by diffusion of titanium in the same substrate.

In a device with a length of about 60 mm a polarization mode dispersion of about 15 psec ($15 \cdot 10^{-12}$ sec) is calculated.

The Applicant has observed experimentally, in an acousto-optical device of the indicated type, a dispersion equal to the calculated value when the device was in the passive state, while a zero value of the PMD was measured in the device in the active state. The active state of the acousto-optical device is the one wherein, by means of appropriate electrical or similar means, a surface acoustical wave is generated that interacts with an optical signal along a pre-established portion of optical path, determining a conversion thereof of the state of polarization. It has been established that the cancellation of the PMD is due to the conversion between the two dispersions half-way along the device and of the symmetry of the device itself.

In high-speed digital optical telecommunications networks (10 Gbit/sec) the temporal distance between two successive impulses (bits) of a signal can be of the order of 50 psec. A phase displacement of the two polarization components of the same bit (splitting), induced by the on device, of a value of 15 psec (or with a higher value, in the case of devices arranged in cascade) can cause superimpositions between successive bits and worsen the quality of transmission even in terms of the bit error rate (BER).

It has now been found that these drawbacks can be overcome by means of an acousto-optical waveguide device with compensation of polarization mode dispersion, comprising a) a first and a second optical path in an optical waveguide, obtained in a first substrate of birefringent material, capable of being traveled by a first and by a second polarization component of an optical signal, orthogonal one to the other, b) means capable of generating a surface acoustical wave, associated with at least one waveguide branch of said optical paths, characterized in that it comprises c) at least one compensation optical path optically connected to said optical paths, said compensation optical path having a prefixed polarization mode dispersion so that the passage time of said first polarization component in said first optical path and in said compensation optical path differs by less than a prefixed amount from the passage time of said second polarization component in said second optical path and in said compensation optical path at least in non-active condition of said device.

According to one embodiment of the invention said at least one compensation optical path and said first and a second optical path obtained in said first substrate have respective refringencies, lengths and respective reciprocal orientations such that the passage time of said first polarization component in said first optical path and in said compensation optical path is substantially equal to the passage time of said second polarization component in said second optical path and in said compensation optical path.

According to another embodiment of the invention, said compensation optical path is formed by at least one first portion of polarization maintaining birefringent optical fibre, connected to said first and second optical path in optical waveguide obtained in said first substrate.

According to a further embodiment of the invention, said compensation optical path is formed by at least one second optical waveguide obtained in a second substrate of birefrangent material, connected to said first and second optical path in optical waveguide obtained in said first substrate.

In the acousto-optical device according to the invention the compensation optical path serves to limit below a prefixed limit any phenomena of polarization mode dispersion present in the first and in the second optical path obtained in the first substrate.

In fact, the speeds of propagation of the two polarization components TM and TE in the two optical paths are substantially compensated because the polarization component TM, endowed with a speed that is lower than that of the polarization component TE in the first optical path, is endowed with a speed that is higher than that of the other polarization component in the second optical path, while the polarization component TE, endowed with a speed that is higher than that of the polarization component TM in the first optical path, is endowed with a speed that is lower than that of the other polarization component in the second optical path. In this way the two polarization components of the optical signal take substantially the same time to cover the total optical path that is the sum of the first and of the second optical path.

Thus, the phase displacement Δt between the same polarization components is practically cancelled and the polarization mode dispersion is substantially eliminated. A decay of the signals in terms of bit error rate (BER) is thus avoided and a considerable improvement is obtained in the quality of transmission at high speed.

Features and advantages of the invention will now be illustrated with reference to embodiments of the invention represented as nonlimiting examples in the enclosed drawings, wherein.

Figure 1:
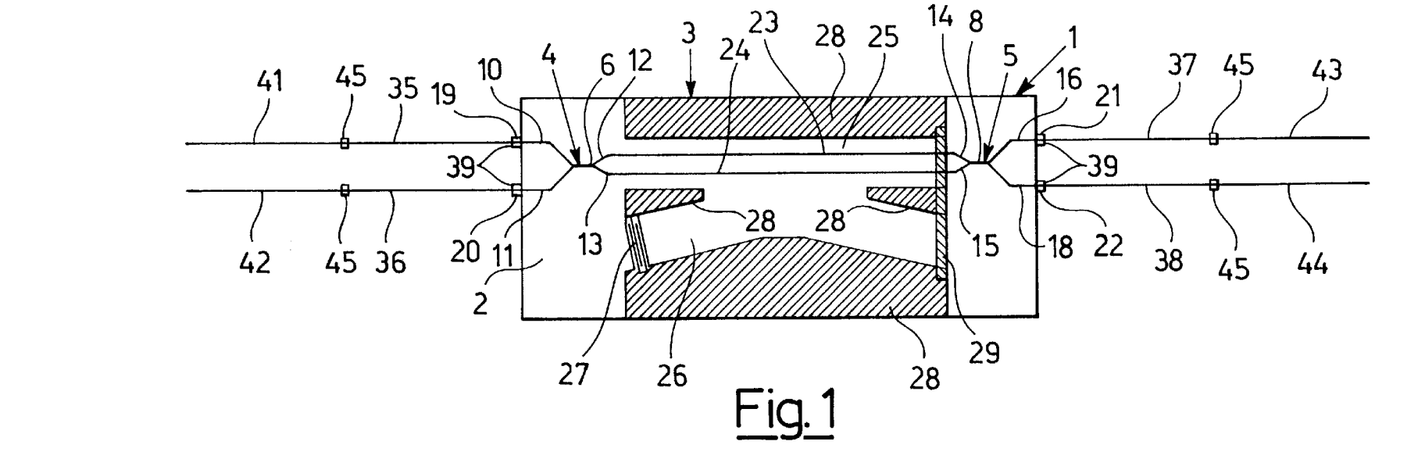
FIG. 1 is a diagrammatic representation of an acousto-optical waveguide device with compensation of polarization mode dispersion, made according to the invention.

There is shown in FIG. 1 an acousto-optical waveguide device with compensation of polarization mode dispersion, made according to the invention. In the specific case, the device comprises an acousto-optical switch of optical signals in waveguide, indicated as a whole with 1, of the 2×2 type, tunable, operating for any input polarization.

The switch 1 comprises a substrate 2 in birefrangent and photoelastic material, consisting of a crystal of lithium niobate (LiNbO₃), having x-cut and y-propagation.

There are obtained in the substrate 2 a polarization conversion stage, indicated as a whole with 3, and polarization selective elements, indicated as a whole with 4 and 5.

The polarization selective elements 4 and 5 are capable of separating orthogonal polarization components TM and TE of an optical signal and they are formed by polarization splitters each comprising respective portions of multimodal optical waveguide 6 and 8, respectively connected to portions of connecting waveguide 10, 11, 12, 13 and 14, 15, 16, 18.

The portions of connecting waveguide 10 and 11 are connected to input ports 19 and 20, respectively, and the portions of connecting waveguide 16 and 18 are connected to output ports 21 and 22, respectively.

The polarization conversion stage 3 comprises two branches of optical waveguide 23 and 24, rectilinear and parallel, an acoustical waveguide 25 containing the two branches of optical waveguide 23 and 24 and an acoustical waveguide 26 containing an electro-acoustical transducer 27.

In relation to the presence of an applied acoustical signal, the orthogonal polarization components TM and TE can travel along an optical path, or track, comprising the waveguide branch 23, the portions of waveguide 6, 12, 14 and 8, one of the two portions of waveguide 10 and 11 and one of the two portions of waveguide 16 and 18 and another optical path comprising the waveguide branch 24, the portions of waveguide 6, 13, 15 and 8, one of the two portions of waveguide 10 and 11 and one of the two portions of waveguide 16 and 18.

Thus, the orthogonal polarization components TM and TE can follow one or the other of the optical paths in waveguide integrated in the substrate 2 for which the portions of waveguide 10, 11, 6, 8, 16 and 18 are common.

The electro-acoustical transducer 27 is formed by interdigital electrodes capable of generating a radio-frequency surface acoustical wave. This surface acoustical wave is collinear, in the polarization conversion stage, with the optical signals that move along the optical waveguide branches 23 and 24.

The acoustical waveguide 25 and 26 are formed by means of areas 28 wherein the speed of the acoustical waves is higher than in the guides 25 and 26. At ends of the acoustical waveguides 25 and 26 there is an acoustical absorber 29. The acoustical waveguide 26 is side by side and in communication with the acoustical waveguide 25 so as to form an acoustical coupler. The acoustical coupler between the acoustical waveguides 25 and 26 is made so that the intensity profile of the surface acoustical wave along the waveguide 25 exhibits a peak in the central portion of said guide and two troughs at the ends of the same guide. The optical signals propagating along the optical waveguide branches 23 and 24 interact with an acoustical wave, having an intensity increasing up to about half way along the optical paths 23 and 24 and decreasing in the remaining part of the optical paths, in an area having a preselected interaction length.

An optical signal with an arbitrary polarization entering through the input port 19 and propagating in the portion of waveguide 10 obtained on the substrate 2 of lithium niobate, splits in the polarization selective element 4 into two orthogonal polarization components TM and TE that, for wavelengths around 1550 nm, propagate one (TM) along the waveguide branch 23 with ordinary index of refraction equal to about 2.226 and the other (TE) along the waveguide branch 24 with extraordinary index of refraction equal to about 2.154.

Under conditions of passive operation of the polarization conversion stage, that is, in the absence of an acoustical wave in the acoustical waveguide 25, the polarization components of the signal propagating in the waveguides 23 and 24 are transmitted unaltered up to respective portions of optical waveguide 14 and 15 of the polarization selective element 5. The two components thus propagate toward the portion of waveguide 16, recombining into a single signal, leaving through output port 21.

Thus, under conditions of passive operation of the polarization conversion stage, the polarization components TE, TM of a signal with arbitrary polarization entering through the input port 19 of the device, travel along an optical path c2 and an optical path c1, respectively. The optical path c2 (component TE at input) comprises the portions of waveguide 10, 6, 13, the waveguide branch 24 and the portions of waveguide 15, 8, 16. The optical path c1 (component TM at input) comprises the portions of waveguide 10, 6, 12, the waveguide branch 23 and the portions of waveguide 14, 8, 16.

But under conditions of active operation of the polarization conversion stage, that is in the presence of an acoustical selection wave in the acoustical waveguide 25, the polarization components of the selected signals propagating in the waveguide branches 23 and 24 are subjected to a conversion into the opposite polarization and are transmitted up to the respective portions of optical waveguide 14 and 15 of the polarization selective element 5. The two components are then transmitted toward the portion of waveguide 18, recombining into a single signal, leaving through output port 22.

Thus, under conditions of active operation of the polarization conversion stage, the polarization components TE, TM of a signal with arbitrary polarization entering through the input port 19 of the device, travel along an optical path c4 and an optical path c3, respectively. The optical path c4 (component TE at input) comprises the portions of waveguide 10, 6, 13, the waveguide branch 24, and, after conversion into the TM component, the portions of waveguide 15, 8, 18. The optical path c3 (component TM at input) comprises the portions of waveguide 10, 6, 12, the waveguide branch 23, and, after the conversion into the TE component, the portions of waveguide 14, 8,18.

The optical paths of an optical signal with arbitrary polarization at input at the input port 20 are symmetrical with respect to those just described: that signal is transmitted to the output 22 or to the output 21, respectively, under conditions of passive or active operation of the polarization conversion stage.

According to the invention, the optical paths in waveguide integrated in the substrate 2 followed by the signals are connected to at least one external compensation optical path, formed by at least one portion of monomodal birefringent optical fibre 35, 36, 37 or 38, of the type with polarization maintenance. In the particular case, the portions of birefringent optical fibres 35 and 36 are connected to the input ports 19 and 20, respectively, and the portions of birefringent optical fibres 37 and 38 are connected to the output ports 21 and 22, respectively by means of connecting elements 39. In turn, the portions of birefringent optical fibres 35, 36, 37 and 38 are connected to monomodal optical line fibres 41, 42, 43 and 44 by means of connections 45, made, for example, through fusion joints.

Suitable birefringent optical fibres of the type with polarization maintenance are for example those presenting elements of internal tension called "PANDA", those with an oval inner clad and such like.

The transverse cross-section of these fibres has an axis called "slow" and an axis called "fast", perpendicular one to the other. Signals with polarization parallel to the slow axis propagate according to a first index of refraction, with a speed lower than the signals having polarization parallel to the fast axis of the fibre, that propagate according to a different value of the index of refraction.

The typical refringence of these fibres, that is the difference between the indices of refraction related to the two axes, is of the order of $\Delta n \approx 0.0001$–$0.001$.

A "PANDA" fibre suitable for the wavelength of 1550 nm is that of the Fujikura Firm identified by the letters SM(C) 15-P.

The portions of birefringent optical fibres 35, 36, 37 and 38 are oriented, with respect to the optical paths in waveguide integrated on the substrate 2, so that their slow axis coincides with the fast axis of the optical paths integrated in waveguide (z in the previous example) and their fast axis coincides with the slow axis of the optical paths integrated in waveguide (x in the previous example). With this the polarization component of the optical signal that has a lower speed in the optical paths 35, 36, 37 and 38 has a higher speed in the optical paths in waveguide of the substrate 2, while the other polarization component, that has a higher speed in the optical paths 35, 36, 37 and 38, has a lower speed in the optical paths in waveguide of the substrate 2. The total passage times in the optical paths 35, 36, 37 and 38 and in the optical paths in waveguide of the substrate 2 are in this way made substantially the same (equivalent) for the two polarization components.

The birefringent optical fibres 35, 36, 37 and 38 have a preselected length $L_e/2$.

The length $L_e$ is linked to the length $L_d$ of the optical paths in waveguide integrated in the substrate 2 by the expression:

$$L_e = L_d \cdot \Delta n_d / \Delta n_e$$

where $\Delta n_d$ is the value of the birefringence of the waveguides integrated on the substrate 2 and $\Delta n_e$ is the value of the birefringence of the birefringent optical fibres 35, 36, 37 and 38.

Optical fibres 35, 36, 37 and 38, having the abovementioned orientations and length $L_e/2$ allow a compensation of polarization mode dispersion of the switch 1 (temporal phase displacement nil, that is $\Delta t=0$) to be obtained, because the times of propagation of the two polarization components in the overall optical path formed by the optical path in waveguide on the substrate 2 and by the external compensation optical path 35, 36, 37, 38 are substantially equal to one another.

The operation of the switch 1 is as follows.

When no voltage is applied across the electro-acoustical transducer 27, the switch 1 is off (off-state) and it is in the condition of direct transmission or parallel state (bar-state) wherein there is direct correspondence between the input ports 19 and 20 and the output ports 21 and 22, respectively. The optical signals originating from the line fibres 41 and 42 travel along the birefringent fibres 35 and 36, enter through ports 19 and 20 and reach the polarization splitter 4 where the polarization components TE and TM are split and sent in the portions of connecting waveguide 12 and 13. The components TE and TM pass unaltered through the branches 23 and 24 of the conversion stage 3 and they are then mixed in the polarization splitter 5 so that the optical signals entering through ports 19 and 20 leave through ports 21 and 22, respectively. The optical signals leaving through ports 21 and 22 travel along the birefringent fibres 37 and 38 and propagate in the line fibres 43 and 44.

When an appropriate switching signal is applied across the electrodes of the transducer 27, the switch 1 is switched on (on-state) and, for the selected signals, it moves to the condition of crossed transmission (cross-state), wherein the input ports 19 and 20 are in correspondence with the crossed output ports, 22 and 21 respectively. The transducer 27 generates a surface acoustical wave (at radio frequency) whose driving acoustical frequency $f_{ac}$ (about 174±10 MHz, for devices operating around 1550 nm and 210±10 MHz for those operating around 1300 nm) corresponding to the length of the (resonance) optical wave at which the polarization conversion TE→TM and TM→TE takes place. The optical signals coming from the line fibres 41 and 42 travel along the birefringent fibres 35 and 36, they enter the polarization splitter 4 where the polarization components TE and TM are split and travel through the waveguide branches 23 and 24 of the conversion stage 3, where they are converted into the orthogonal polarization state. The new polarization components TM and TE are then sent into the polarization splitter 5. In this way, the polarization components at the selected wavelengths coming from the input port 19 leave through the output port 22 together with the components at the non-selected wavelengths coming from the input port 20. The polarization components at the selected wavelengths coming from the input port 20 leave through the output port 21 together with the components at the non-selected wavelengths coming from the input port 19.

The optical signals, that in the conversion stage 3 are subjected to a polarization conversion, are guided in the completely crossed state (cross-state), producing the function of total switching. The optical signals leaving through the ports 21 and 22 travel along the birefringent fibres 37 and 38 and propagate in the line fibres 43 and 44.

When the switch 1 is in the active state there is no polarization mode dispersion, either in the presence or in the absence of the birefringent optical fibres 35, 36, 37, 38, due to the polarization conversion that takes place about half way along the optical path integrated on the substrate 2. In that way, in the absence of the birefringent optical fibres, the slow and fast polarization components change over with one another in the respective optical paths and the polarization mode dispersion is compensated inside the substrate. In the presence of birefringent optical fibres, each portion of optical path on the substrate, wherein the signal maintains a polarization, is separately compensated by a portion of birefringent optical fibre corresponding to it, thus performing a total compensation.

In the presence of the birefringent optical fibres 35, 36, 37, 38, the polarization mode dispersion is equally compensated, since the additional delay accumulated between the two polarization components due to the passage through the birefringent optical fibre 35 (or 36) is compensated by an advance, having the same absolute value, due to the passage (with the polarizations exchanged as a result of the polarization conversion) in a section of birefringent fibre 38 (or 37) having features similar to those of the birefringent fibre 35 (or 36) and, in particular, the same length and the same birefringence.

In order to obtain the same effect of compensation of polarization mode dispersion, it is possible to make recourse to variants of the configuration of the acousto-optical device shown in FIG. 1.

The external compensation optical path can be made by using a first portion of birefringent optical fibre of length $L_e$ connected to the input port 19 (or 20) and a second portion of birefringent optical fibre of length $L_e$ connected to the output port 22 (or 21). For example, with a substrate 2 of lithium niobate having a length of about 60 mm, two fibres may be used having length $L_e$ equal to about 8.6 m and a birefringence index of about $\Delta n_e = 0.0005$.

In the case wherein only one of the two inputs of the device 1 is actually used, for example the input port 19, it is possible to obtain the compensation of the polarization mode dispersion through a single birefringent optical fibre, with length $L_e$, connected, in the example, to the output port 21.

More in general, the external compensation optical path can be made by using birefringent optical fibres 35, 36, 37, 38 having length equal to a, $L_e$–a, $L_e$–a, a, where a is an arbitrary length ranging from 0 to $L_e$.

Figure 3:
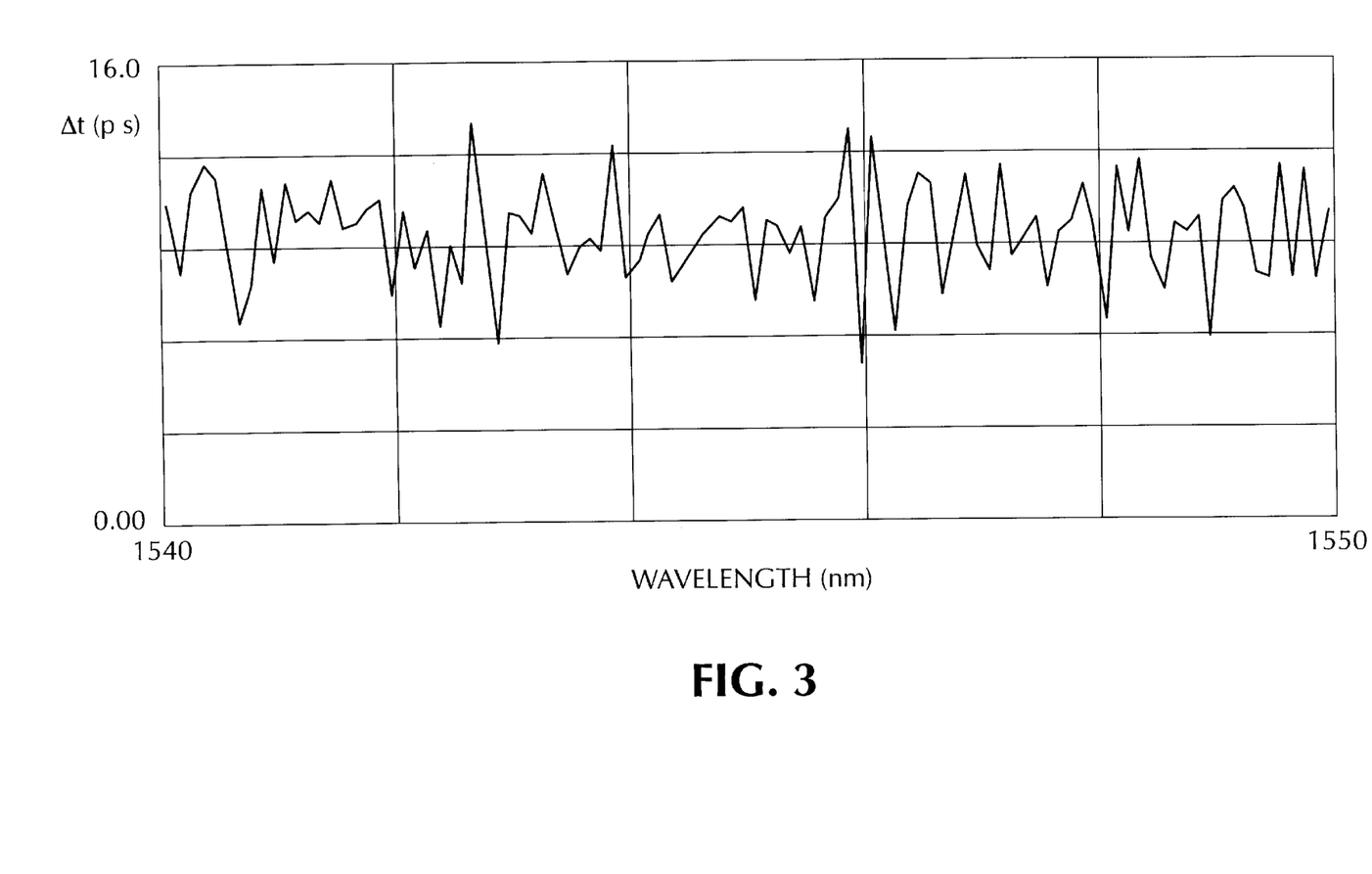
FIGS. 3, 4 and 5 are graphs that show the results of tests performed with the acousto-optical device of the invention.
Figure 4:
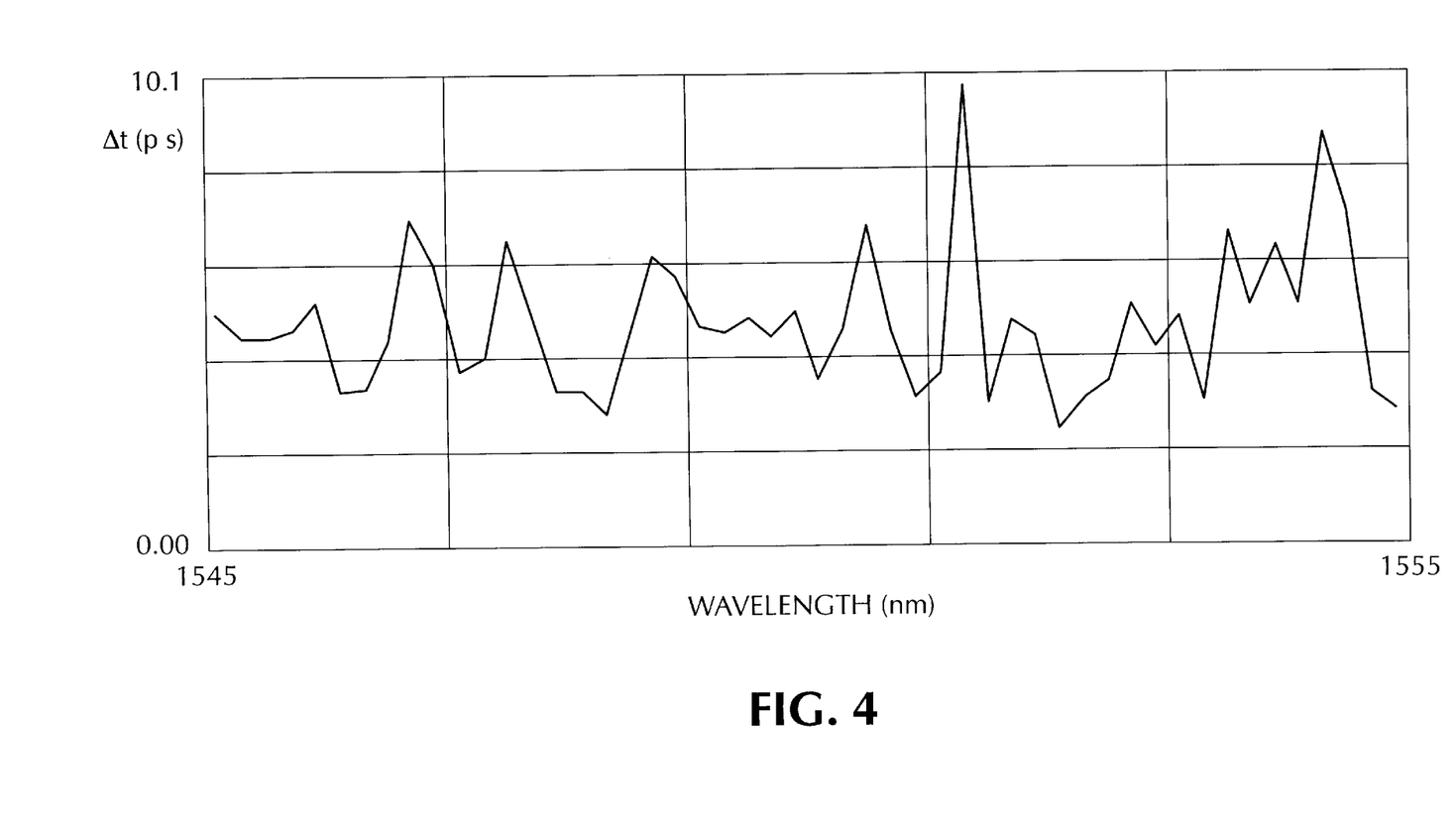
Figure 5:
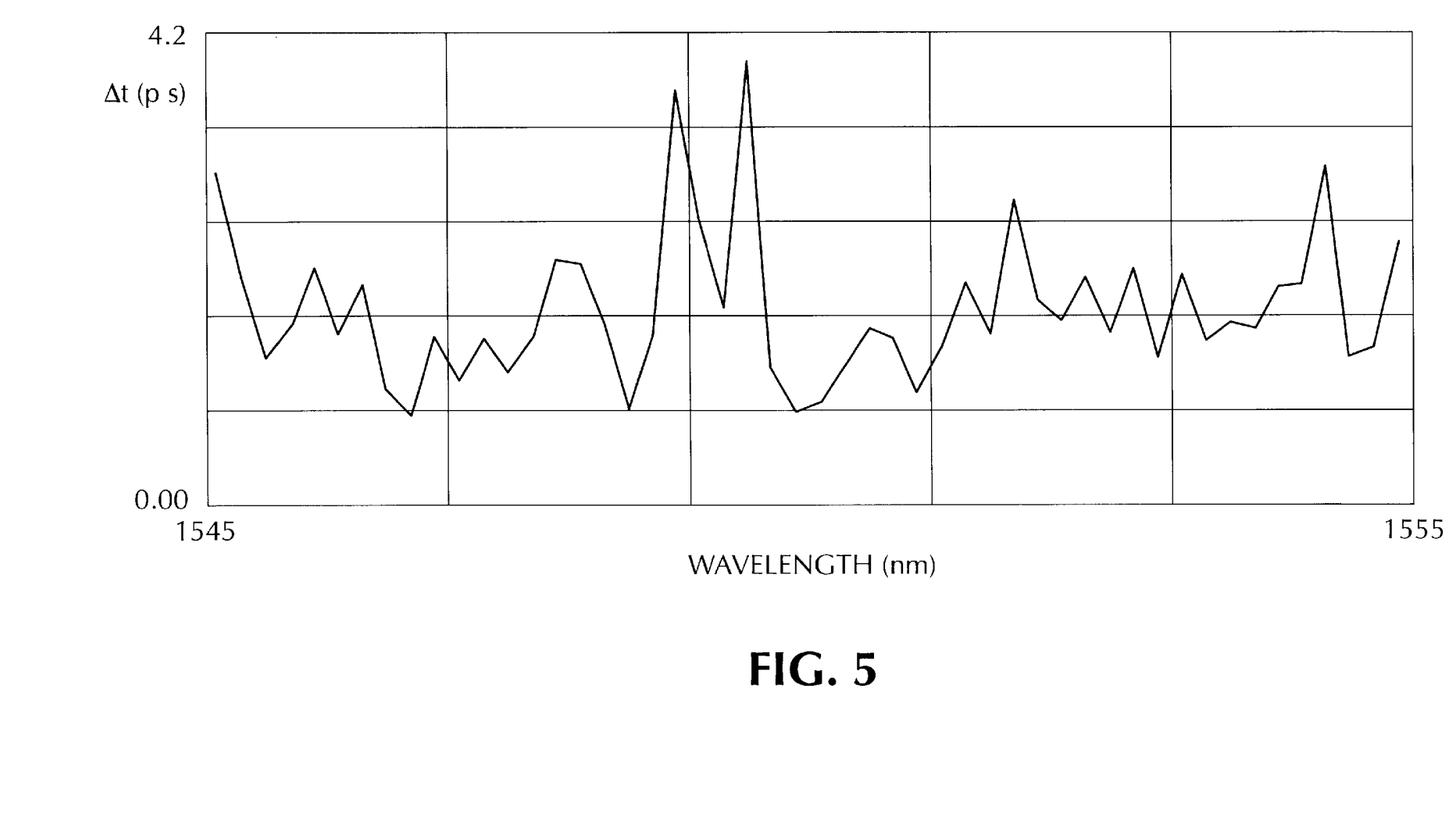
Figure 6:
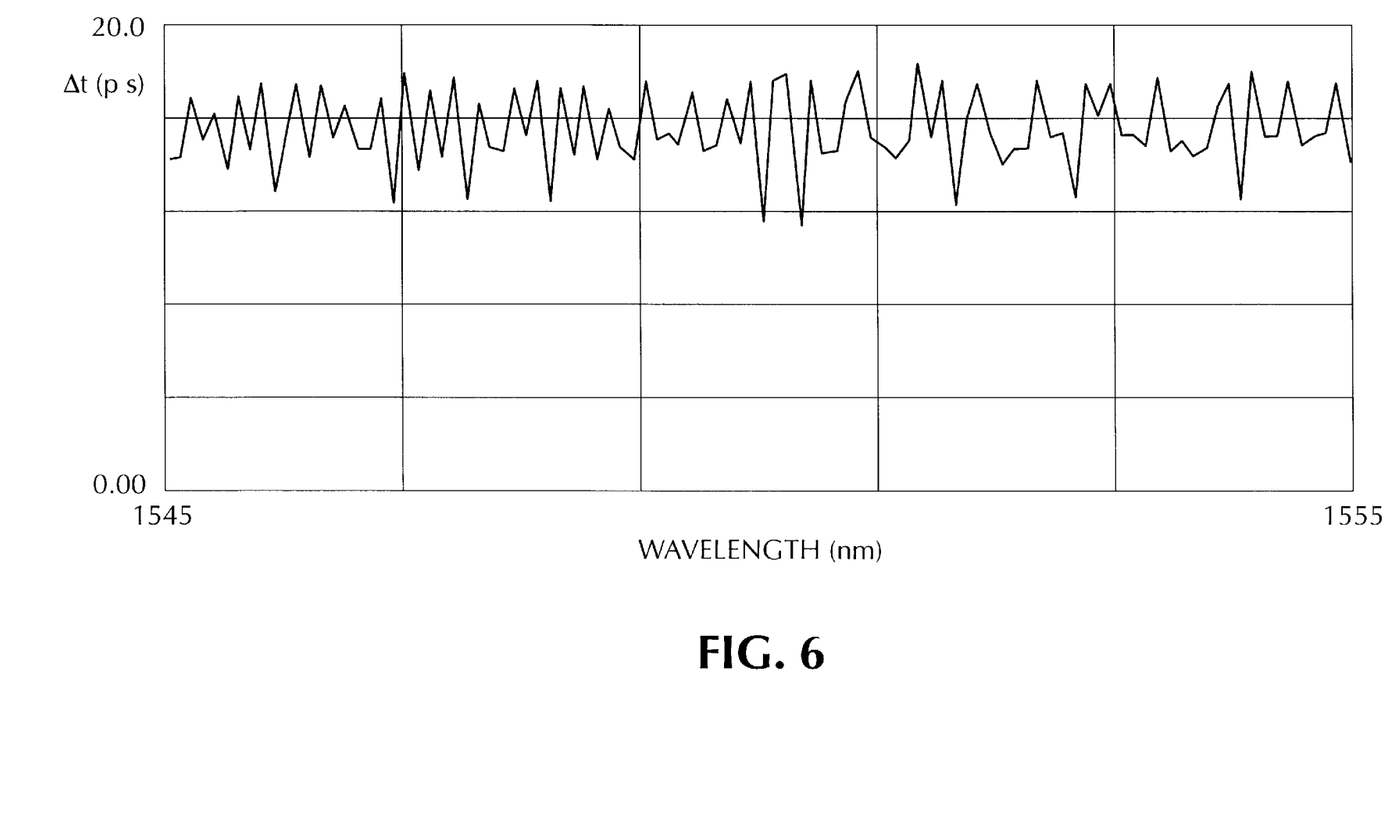
FIG. 6 is a graph that illustrates the results of a comparison test performed with a traditional acousto-optical device.

There are shown in FIGS. 3, 4 and 5 curves of the differential delay $\Delta t$ (ps) against the wavelength $\lambda$ (nm) observed under conditions of direct transmission (bar-state) in an acousto-optical device comprising a switch (in the passive state) made in a substrate 2 of lithium niobate having length of about 4.1 cm for three different values of the length of the birefringent compensation fibre, 53 cm, 4.53 m and 6.53 m, respectively. It is seen that the average value of $\Delta t$ id equal to 10.1 ps, 4.8 ps and 1.8 ps, respectively, The advantages of the invention appear evident by comparing the results given in FIGS. 3, 4 and 5 with those given in FIG. 6 related to a traditional acousto-optical device, with no external compensation optical path, endowed with a substrate having length of 6.2 cm. In this case the average value of $\Delta t$ is equal to 15.7 ps.

Figure 7:
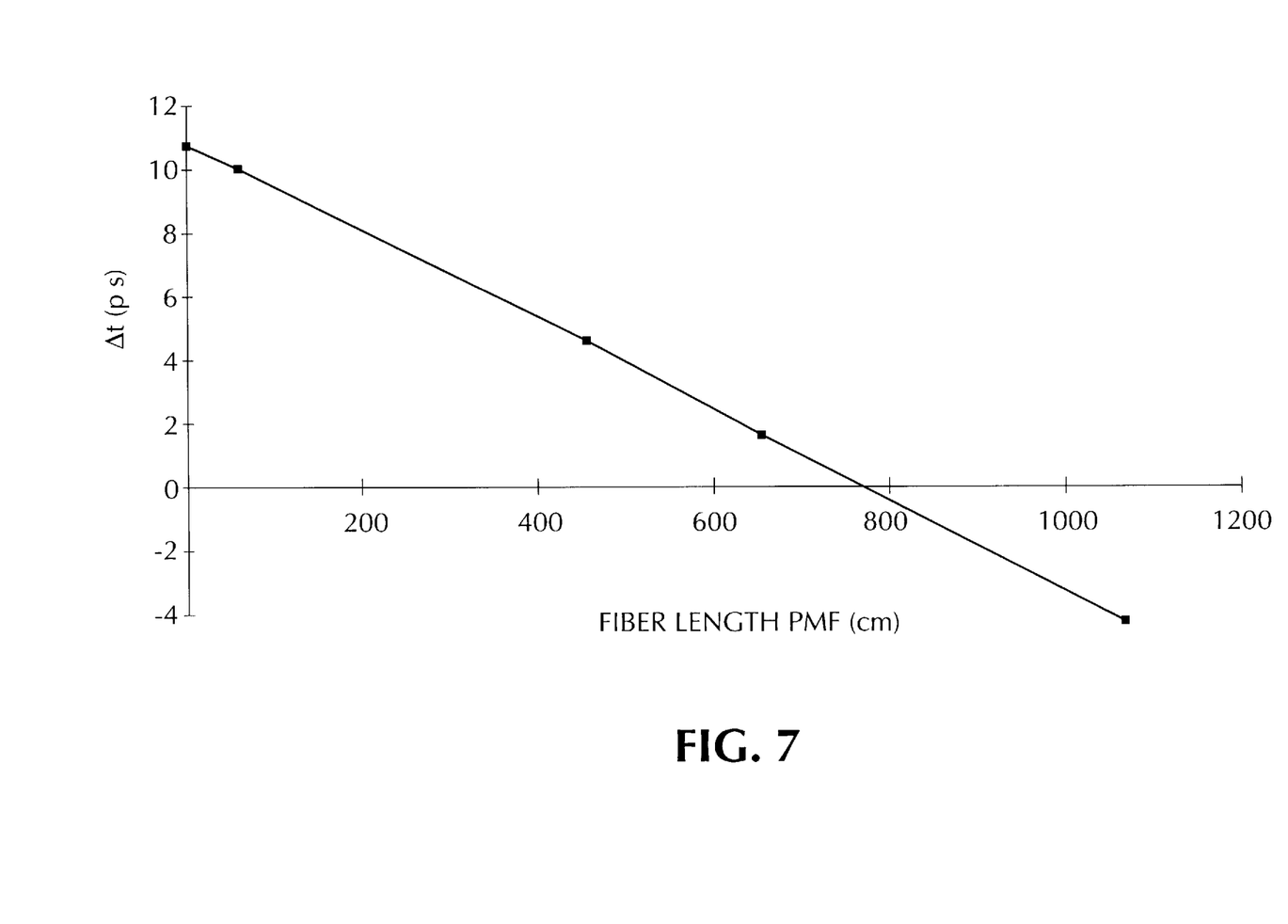
FIG. 7 is a graph that gives the polarization mode dispersion of the device of FIG. 1 against the length of a compensation optical path.

These results are summarized in FIG. 7 wherein there is shown the curve of the differential delay $\Delta t$ (in picoseconds), against the length $L_e$ (in centimeters) of a birefringent fibre of the PANDA SM(C) 15-P type having a birefringence of about $\Delta n_e = 4.5 \cdot 10^{-4}$. The figure related to the device of FIG. 6 (length of the compensation optical path equal to zero) has been calculated taking into account the difference between the length of the substrate and the length of the substrate of the devices of FIGS. 3, 4 and 5. It is seen that the length of the birefringent fibre capable of totally compensating the polarization mode dispersion ($\Delta t = 0$) has length equal to 785 cm.

Figure 2:
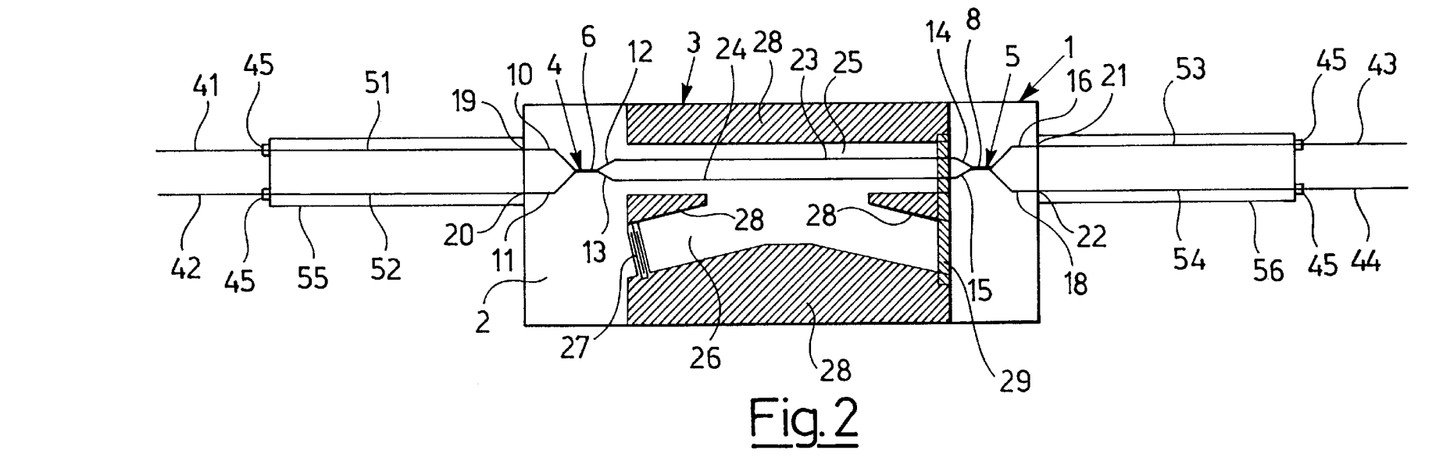
FIG. 2 shows a variant of the acousto-optical device of FIG. 1.

There is shown in FIG. 2 a variant of the acousto-optical device of FIG. 1 wherein the same parts are indicated with the same numbers. In this device the external compensation optical path is formed by optical paths in waveguide 51, 52, 53 and 54 made in two additional substrates of lithium niobate 55 and 56 optically connected to the substrate 2. To the optical paths 51, 52, 53 and 54 there are connected the line optical fibres 41, 42, 43 and 44 by means of connecting elements 45. The substrates 55 and 56 are of the type with z-cut and y-propagation while the substrate 2, as previously said, is of the type with x-cut and y-propagation. The substrates 55 and 56 are oriented with respect to the substrate 2 so that the z-axis of the substrates 55 and 56 coincides with the x-axis of the substrate 2 and the x-axis of the substrates 55 and 56 coincides with the z-axis of the substrate 2. The optical paths 51, 52, 53 and 54 have length equal to $L_e/2$.

$$L_e = L_d \cdot \Delta n_d / \Delta n_e$$

According to another variant of the invention, the compensation optical paths can be formed by compensation stages made in a birefringent material (birefringence $\Delta n_e$) suitably oriented, with total length given by the expression:

$$L_e = L_d \cdot \Delta n_d / \Delta n_e.$$

The switch 1 of the acousto-optical devices shown in FIGS. 1 and 2 has the advantage of being reversible, in the sense that the output ports 21 and 22, and the fibres connected to them, can be used as the input ports and the input ports 19 and 20, and the fibres connected to them, can be used as the output ports.

The switch 1 is capable of operating at room temperature with a band of optical wavelengths up to 100 nm wide centered, for example, around the wavelength of 1550 nm or of 1300 nm, which are particularly interesting for optical telecommunications.

The substrate 2 consists, as said, of a crystal of lithium niobate cut perpendicularly to the crystallographic axis x and the optical paths in optical waveguide are directed along the y-axis of the crystal. The substrates 55 and 56 consist of crystals of lithium niobate cut perpendicularly to the crystallographic axis z and the optical paths in optical waveguide 51, 52, 53 and 54 are directed along either the x-axis or the y-axis of the crystal. Instead of the lithium niobate it is possible to use another birefringent and photoelastic material selected for example among the group $LiTaO_3$, $TeO_2$, $CaMoO_4$. The length of the substrate 2 is about 40–60 mm.

The optical paths in optical waveguide on the substrate 2 and the optical waveguide 51, 52, 53 and 54 can be made by means of diffusion in the substrate 2 of a substance capable of raising the index of refraction. Using a photolithographic mask, it is possible to perform a deposition of a layer of Ti having a thickness, for example, of about 120 nm and the subsequent diffusion for 9 hours at a temperature of 1030°

C. At the optical paths in waveguide, the mask has, for example, an opening having a width of about 7 nm.

The acoustical waveguides 25 and 26 can be made by means of a photolithographic mask circumscribing the strips 28 of the substrate 2. Inside the surface circumscribed by the openings of the mask a deposition is performed of a layer of Ti with a thickness, for example, of 160 nm and a subsequent diffusion of the Ti in the substrate for 31 hours in an oven at a temperature of 1060° C. Due to the diffusion, the speed of the acoustical waves increases by about 0.3%, so that the areas 28 act by confining the acoustical waves along the guides 25 and 26.

The optical waveguides are preferably monomodal for the optical waves used.

Preferably, the electro-acoustical transducer 27 comprises 15–20 or more pairs of interdigital electrodes with a periodicity of about 20.8 microns. Preferably, the electrodes have a variable pitch ("chirp") so as to expand the response band. The value of the periodicity depends on the value of the wavelength in the lithium niobate of a surface acoustical wave with a frequency of about 173.5 MHz, which is the value necessary for the TM↔TE conversion at an optical wavelength around 1550 nm. By modifying the periodicity of the electrodes, it is possible to produce transducers suitable for acousto-optical devices operating in other wavelength bands. The electrodes can be made by depositing on the substrate a metal layer, for example, aluminium, with a thickness of about 500 nm.

It is possible to tune the acousto-optical device to the wavelength of 1500 nm or of 1600 nm, displaced by 50 nm with respect to the central wavelength of 1550 nm, by providing the interdigital electrodes with a power of about 100 mW against the roughly 50 mW required for operations at the central wavelength.

Although the present invention has been described with reference to acousto-optical devices, it is applicable to optical devices wherein the selection of the optical paths is performed by selection means other than acoustical means, for example, electro-optical or opto-optical or magneto-optical devices and such like.

We claim:

1. An acousto-optical waveguide device with compensation of polarization mode dispersion, comprising:
   a) a first and a second optical path in an optical waveguide, obtained in a first substrate of birefringent material, each of the first and second optical paths capable of being traveled by a first and by a second polarization component of an optical signal, the first polarization component being orthogonal to the second polarization component;
   b) means capable of generating a surface acoustical wave, associated with at least one waveguide branch of said optical paths; and
   c) at least one compensation optical path optically connected to said optical paths, said compensation optical path having a prefixed polarization mode dispersion so that the passage time of said first polarization component in said first optical path and in said compensation optical path differs by less than a prefixed amount from the passage time of said second polarization component in said second optical path and in said compensation optical path at least in a non-active condition of said device.

2. An acousto-optical device according to claim 1, characterized in that said at least one compensation optical path and said first and second optical paths obtained in said first substrate have respective birefringencies, lengths and reciprocal orientations such that the passage time of said first polarization component in said first optical path and in said compensation optical path differs by less than a prefixed amount from the passage time of said second polarization component in said second optical path and in said compensation optical path.

3. An acousto-optical device according to claim 2, characterized in that said length of said compensation optical path is determined by the expression:

$$L_e = L_d \cdot \Delta n_d / \Delta n_e$$

where $L_d$ is the length of one of said first and second optical paths, $\Delta n_d$ is the birefringence of said first and second optical paths and $\Delta n_e$ is the birefringence of said compensation optical path.

4. An acousto-optical device according to claim 2, characterized in that said compensation optical path is formed by at least one first portion of polarization maintaining birefringent optical fibre, connected to said first and second optical paths in the optical waveguide obtained in said first substrate.

5. An acousto-optical device according to claim 4, wherein said length of said compensation optical path is determined by the expression:

$$L_e = L_d \cdot \Delta n_d / \Delta n_e$$

where $L_d$ is the length of one of said first and second optical paths, $\Delta n_d$ is the birefringence of said first and second optical paths and $\Delta n_e$ is the birefringence of said compensation optical path and characterized in that said first portion of birefringent optical fibre has a length equal to $L_e$.

6. An acousto-optical device according to claim 2, characterized in that said compensation optical path is formed by at least one second optical waveguide obtained in a second substrate of birefringent material, connected to said first and second optical paths in the optical waveguide obtained in said first substrate.

7. An acousto-optical device according to claim 6, wherein said length of said compensation optical path is determined by the expression:

$$L_e = L_d \cdot \Delta n_d / \Delta n_e$$

where $L_d$ is the length of one of said first and second optical paths, $\Delta n_d$ is the birefringence of said first and second optical paths and $\Delta n_e$ is the birefringence of said compensation optical path and characterized in that said second optical waveguide has a length equal to $L_e$.

8. An acousto-optical waveguide device with compensation of polarization mode dispersion, comprising:
   a first and a second optical path in an optical waveguide, obtained in a first substrate of birefringent material, each of the first and second optical paths capable of being traveled by a first and by a second polarization component of an optical signal, the first polarization component being orthogonal to the second polarization component;
   means capable of generating a surface acoustical wave, associated with at least one waveguide branch of said optical paths;
   wherein said first substrate further comprises:
      at least one polarization conversion stage that includes a first and a second branch in the optical waveguide of said first and second optical paths,
      at least one acoustical waveguide containing said branches in the optical waveguide, said means for generating a surface acoustical wave being associated with said branches in the optical waveguide, and an input polarization selective element in said polarization conversion stage and an output polarization selective element in said polarization conversion stage being connected to said branches in the optical waveguide in order to separate and recombine said first and second polarization components at input ports and at output ports; and at least one compensation optical path optically connected to said optical paths, wherein said at least one compensation optical path has a prefixed polarization mode dispersion and wherein said at least one compensation optical path and said first and second optical paths obtained in said first substrate have respective birefringencies, lengths and reciprocal orientations such that, at least in a non-active condition of said device, the passage time of said first polarization component in said first optical path and in said compensation optical path differs by less than a prefixed amount from the passage time of said second polarization component in said second optical path and in said compensation optical path.

9. An acousto-optical device according to claim 8, wherein said compensation optical path is formed by at least one first portion of polarization maintaining birefringent optical fibre, connected to said first and second optical paths in the optical waveguide obtained in said first substrate, and characterized in that said at least one first portion of polarization maintaining birefringent optical fiber comprises respective portions of birefringent optical fibres of the type with polarization maintenance connected to said input ports and to said output ports.

10. An acousto-optical device according to claim 8, wherein said compensation optical path is formed by at least one second optical waveguide obtained in a second substrate of birefringent material, connected to said first and second optical paths in the optical waveguide obtained in said first substrate, and characterized in that respective optical waveguides obtained in said second and in a third substrate of birefringent material are connected to said input ports and to said output ports.

11. An acousto-optical device according to claim 9, characterized in that said portions of birefringent optical fibres of the type with polarization maintenance are oriented with respect to said first and second optical paths in the waveguide so that their slow axis coincides with the fast axis of said first and second optical paths in the waveguide and their fast axis coincides with the slow axis of said first and second optical paths in the waveguide.

12. An acousto-optical device according to claim 9, wherein said length of said compensation optical path is determined by the expression:

$$L_e = L_d \cdot \Delta n_d / \Delta n_e$$

where $L_d$ is the length of one of said first and second optical paths, $\Delta n_d$ is the birefringence of said first and second optical paths and $\Delta n_e$ is the birefringence of said compensation optical path and characterized in that each of said portions of birefringent optical fibre of the type with polarization maintenance has a length equal to $L_e/2$.

13. An acousto-optical device according to claim 10, wherein said length of said compensation optical oath is determined by the expression:

$$L_e = L_d \cdot \Delta n_d / \Delta n_e$$

where $L_d$ is the length of one of said first and second optical paths, $\Delta n_d$ is the birefringence of said first and second optical paths and $\Delta n_e$ is the birefringence of said compensation optical path and characterized in that each of said optical waveguides obtained in said second and third substrates has a length equal to $L_e/2$.

14. An acousto-optical device according to claim 9, characterized in that each of said portions of birefringent optical fibre of the type with polarization maintenance has an index of birefringence ranging from about 0.0001 to about 0.001.

15. The acousto-optical waveguide device of claim 8, wherein said compensation optical path is formed by at least one second optical waveguide obtained in a second substrate of birefringent material and connected to said first and second optical paths in the optical waveguide obtained in said first substrate, wherein optical waveguides obtained, respectively, in said second substrate and in a third substrate of birefringent material are connected to said input ports and to said output ports and wherein said first substrate is formed by a crystal of lithium niobate having x-cut and y-propagation and said second and third substrates are oriented with respect to said first substrate so that the z-axis of said second and third substrates coincides with the x-axis of said first substrate and the x-axis of said second and third substrates coincides with the z-axis of said first substrate.

16. A method of transmission of an optical signal comprising:

i) traveling one of first and second polarization components of said optical signal through one of at least first and second optical paths that may be selected of a birefringent optical device, said first and second optical paths having respective values of polarization mode dispersion; and ii) traveling said optical signal through at least one compensation optical path with a prefixed birefringence, said compensation optical path having a value of polarization mode dispersion such as to compensate in said signal at least a part of the polarization mode dispersion associated with at least one of said optical paths.

17. A method of transmission of an optical signal comprising:

i) traveling one of first and second polarization components of said optical signal through one of at least first and second optical paths that may be selected of a birefringent optical device, wherein said first and second optical paths have respective values of polarization mode dispersion;

ii) traveling said optical signal through at least one compensation optical path with a prefixed birefringence, wherein said compensation optical path has a value of polarization mode dispersion such as to compensate in said signal at least a part of the polarization mode dispersion associated with at least one of said optical paths;

iii) traveling the first and the second polarization components through the first and the second optical paths with respective preselected propagation speeds; and iv) traveling said optical signal through said compensation optical path with a preselected propagation speed, wherein said propagation speeds are such that the passage time of said first polarization component in said first optical path and in said compensation optical path is substantially equal to the passage time of said second polarization component in said second optical path and in said compensation optical path.

* * * * *

UNITED STATES PATENT AND TRADEMARK OFFICE
CERTIFICATE OF CORRECTION

PATENT NO.  : 5,850,492
DATED       : December 15, 1998
INVENTOR(S) : Morasca et al It is certified that error appears in the above-indentified patent and that said Letters Patent is hereby corrected as shown below:

Col. 2, line 56, change "frangent" to --fringent--;

Col. 3, line 39, change "birefrangent" to -- birefringent--;

Col. 8, line 29, change "$L_e/2$" to --$L_d/2$--;

Col. 10, line 47, after "length" insert --$L_e$--; change "$L_e$" to --$L_d$--;

Col. 12, line 4, after "length" insert --$L_e/2$--; change "$L_e/2$" to --$L_d/2$--.

Signed and Sealed this

Thirty-first Day of August, 1999

Attest:

Attesting Officer

Q. TODD DICKINSON

Acting Commissioner of Patents and Trademarks